C. H. CUSHING.
Flange-Coupling.

No. 217,997. Patented July 29, 1879.

WITNESSES:
Henry N. Miller
C. Sedgwick

INVENTOR:
C. H. Cushing
BY Munn &c
ATTORNEYS.

UNITED STATES PATENT OFFICE.

CHARLES H. CUSHING, OF TIDIOUTE, PENNSYLVANIA.

IMPROVEMENT IN FLANGE-COUPLINGS.

Specification forming part of Letters Patent No. 217,997, dated July 29, 1879; application filed May 16, 1879.

*To all whom it may concern:*

Be it known that I, CHARLES H. CUSHING, of Tidioute, in the county of Warren and State of Pennsylvania, have invented a new and Improved Flange-Coupling, of which the following is a specification.

Figure 1:
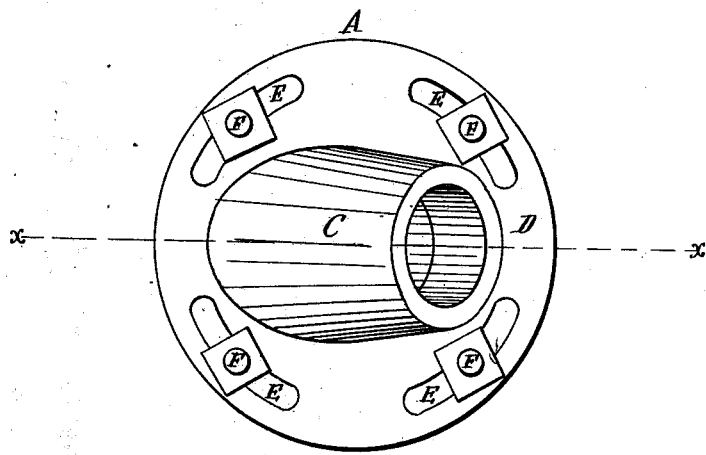
Figure 2:
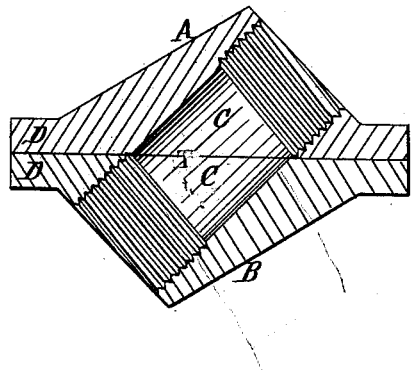

Figure 1 is a plan of the device. Fig. 2 is a sectional elevation on line *x x*, Fig. 1.

Similar letters of reference indicate corresponding parts.

The object of this invention is to provide a coupling that shall connect sections of pipe at any angle to each other from a straight line to an angle of ninety degrees.

The invention consists of two circular plates, A and B, each flat on one face, and provided on the other with a short tubular projection, C, sloping from its center, whose bore is inclined at an angle of forty-five degrees to the plane of the flat face, and is extended through it. The flanges D of the plates are furnished with slotted bolt-holes E, that are curved to correspond with the circumference of the plates, and through these pass the bolts F, provided with nuts for the purpose of holding the plates together.

By loosening the nuts the plates can be turned partly round and the angular relations of the tubes changed within certain limits.

By separating the plates and setting them together again with the relative positions of the slots changed, it is obvious that the tubes can be arranged at any angle to each other within ninety degrees.

This coupling serves as an elbow for pipe, and for uniting sections in almost any desired position. It may be furnished with a screw-thread inside or outside of the tubular portions, or may be made without it.

Having thus described my invention, I claim as new and desire to secure by Letters Patent—

The within-described flange-coupling, consisting of the two flanged plates A and B, provided with sloping tubular projections C C and curved slots E E in their flanges, through which pass the bolts F F, that are provided with nuts to hold the plates together.

CHAS. H. CUSHING.

Witnesses:
GEO. L. BINNEY,
C. C. THOMPSON.